No. 674,198. Patented May 14, 1901.
J. CUNNINGHAM.
DEVICE FOR OPERATING MARKERS OF CORN PLANTERS.
(Application filed Feb. 7, 1901.)
(No Model.)

WITNESSES:

INVENTOR
Joseph Cunningham
BY
ATTORNEYS

THE NORRIS PETERS CO., PHOTO-LITHO., WASHINGTON, D. C.

UNITED STATES PATENT OFFICE.

JOSEPH CUNNINGHAM, OF MATTOON, ILLINOIS.

DEVICE FOR OPERATING MARKERS OF CORN-PLANTERS.

SPECIFICATION forming part of Letters Patent No. 674,198, dated May 14, 1901.

Application filed February 7, 1901. Serial No. 46,371. (No model.)

*To all whom it may concern:*

Be it known that I, JOSEPH CUNNINGHAM, a citizen of the United States, and a resident of Mattoon, in the county of Coles and State of Illinois, have invented a new and Improved Device for Operating the Markers of Corn-Planters, of which the following is a full, clear, and exact description.

One purpose of the invention is to provide a device adaptable to any corn-planter whereby the marker may be quickly and conveniently raised by the foot of the driver to free the marker from any trash which may be gathered thereby or which may cling thereto, thus securing a plain mark during the planting process and facilitating the straight planting of corn.

A further purpose of the invention is to so construct the device of the character described that the marker may be quickly raised to clear a rock, stump, or other obstruction and may be as quickly lowered without undue exertion on the part of the driver.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
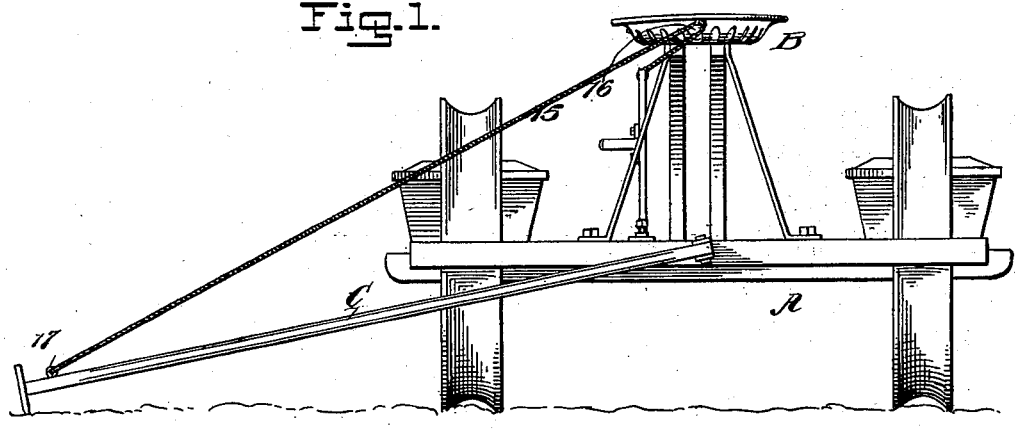
Figure 2:
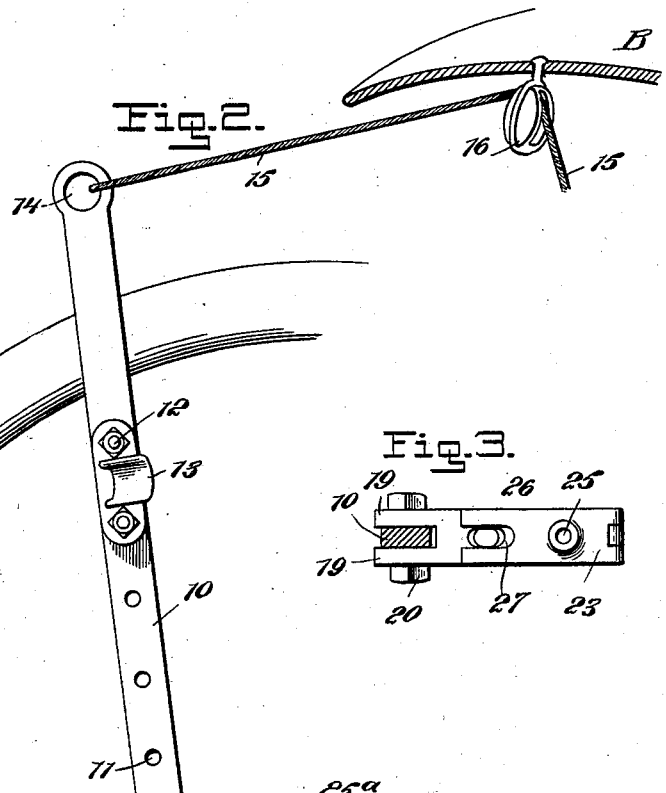
Figure 3:
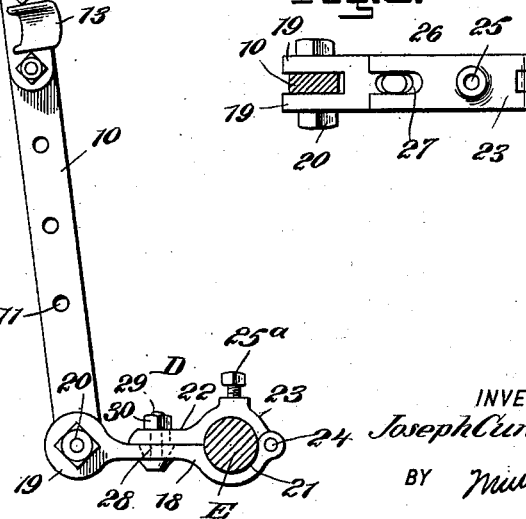

Figure 1 is a rear elevation of a planter and its marker, illustrating the application of the improvement to the planter and marker. Fig. 2 is an enlarged side elevation of the attachment and a partial sectional view of the seat and a partial view of one of the wheels, and Fig. 3 is a transverse section through the lower portion of the body-section of the attachment.

A represents a planter, which may be of any desired type. B represents the seat for the planter, and C the marker-arm, which is pivotally attached to the planter and is capable of swinging upward and downward or to or from the ground. The body portion of the device consists of a lever 10, in which a series of apertures 11 is produced, so that through the medium of bolts 12 a foot-rest, foot-bar, or stirrup 13 may be adjustably attached to said lever 10 to accommodate the operator. An eye 14 is formed at the upper end of the lever 10, and a rope or chain 15 or its equivalent is attached to the said lever at the eye 14. This rope, cord, or chain 15 is passed over a pulley 16, usually attached to the driver's seat, as shown in Figs. 1 and 2, and the opposite end of the said rope, cord, or chain 15 is attached to the outer end of the marker-arm C through the medium of the eye-bolt 17 or the equivalent thereof.

In addition to the lever 10 the attachment consists of a clamp D, which is adapted to secure the device to the axle E of the planter, as illustrated in Fig. 2. This clamping member of the device comprises a lower section 18, having twin eyes 19 at one end to receive between them the lower end of the lever 10, and a suitable bolt 20 is passed through the eyes and the lower portion of the lever, so that the lever is pivotally attached to the clamping member. The lower section 18 of the clamping member is provided at its opposite end with a semicircular portion 21, the upper face of which semicircular portion is preferably concaved.

In addition to the lower section 18 of the clamp a shorter and upper section 22 is provided. This shorter and upper section 22 is provided with a semicircular portion 23 at what may be termed its "rear end," whose under face is concave, and this portion 23 of the upper section 22 of the clamp is pivoted or hinged to a corresponding portion 21 of the lower section by suitable knuckles and pins 24, and the space between the curved or enlarged portions 21 and 23 of the sections of the clamp is such that the said space when the sections of the clamp are locked together will snugly receive the axle E.

A threaded opening 25 is made in the top of the enlarged portion 23 of the upper section of the clamp, and this threaded opening is adapted to receive a set-screw 25$^a$, which extends to the axle E and serves to assist in holding the clamp thereon. The forward portion 26 of the upper section of the clamp E is flat and lies closely upon the body or intermediate portion of the lower section 18 of the clamp. This forward portion 26 of the upper section of the clamp D is bifurcated or provided with a slot 27, as is illustrated best in Fig. 3, and the body or intermediate portion of the lower section 18 of the clamp, just below the slot 27, is provided with a conical opening 28, adapted to receive a bolt 29, provided with a suitable head at its bottom and a nut 30 at the top. This bolt secures the forward portions of the two sections of the clamp together, and when the clamp is to be removed from the axle the nut 30 is loosened and the bolt is permitted to drop forward, whereupon the bolt will pass out of the slot 27 in the upper section of the clamp, and the nut will not engage with the upper section, as it is separated from the lower section. This action is due to the peculiar formation of the opening 28 in the bottom section of the clamp.

In operation it will be observed that if the driver presses the footpiece 13 forward with the foot the end of the marker which is in engagement with the ground will be immediately raised with but little effort on the part of the operator, and as soon as the lever 10 is relieved from outward pressure the marker will at once drop to working position.

Having thus described my invention, I claim as new and desire to secure by Letters Patent—

1. A device for operating the markers of corn-planters, comprising a lever having one end adapted for connection with the marker, and a clamp to which the opposite end of the lever is pivoted, which clamp is adapted for attachment to a portion of a planter, as set forth.

2. A device for operating the markers of corn-planters, comprising a lever, a foot-rest adjustable upon the lever, and a clamp pivotally attached to said lever, which clamp is constructed in hinged sections having a bolt connection, the opposing faces of the two sections being provided with an opening adapted to receive the axle of a planter or like support, as described.

3. A marker for corn-planters, consisting of a lever having its upper end adapted for attachment to a marker, a foot-rest carried by the said lever, and a clamp pivotally attached to the opposite end of the lever, which clamp is constructed in hinged sections, the sections having registering recesses in opposite faces, forming an opening adapted to receive an axle or like support, a set-screw carried by the upper section of the clamp, extending into its recessed portion, the free end of the upper section having a slot therein, the lower section being provided with a registering conical opening, and a bolt passed through said opening and through the opening in the bottom section of the clamp and the slot in the upper section of the clamp, for the purpose set forth.

4. The combination, with a planter, its axle, seat and a marker having a pivotal connection with the planter, of a lever which extends upward in direction of the seat at the front thereof, a foot-rest secured to the lever, a clamp removably attached to the axle and pivotally connected with the lever, a pulley located on the seat, and a cord, rope or chain attached to the upper end of the lever, which rope, cord or chain is passed over the said pulley and is connected with the marker near its outer end, for the purpose specified.

In testimony whereof I have signed my name to this specification in the presence of two subscribing witnesses.

JOSEPH CUNNINGHAM.

Witnesses:
WESLEY SPITLER,
JNO. G. THODE.